United States Patent
Bingel et al.

(10) Patent No.: US 6,845,157 B1
(45) Date of Patent: Jan. 18, 2005

(54) LINEAR POLARITY GUARD AND METHOD FOR DSL-READY POTS DEVICES

(75) Inventors: Thomas Bingel, Belleair Beach, FL (US); Ramon Hazen, N. Redington Beach, FL (US)

(73) Assignee: Paradyne Corporation, Largo, FL (US)

( * ) Notice: Subject to any disclaimer, the term of this patent is extended or adjusted under 35 U.S.C. 154(b) by 743 days.

(21) Appl. No.: 09/597,309

(22) Filed: Jun. 20, 2000

Related U.S. Application Data (60) Provisional application No. 60/182,345, filed on Feb. 14, 2000.

(51) Int. Cl.[7] ............................................... H04M 1/00
(52) U.S. Cl. ..................... 379/399.1; 379/380; 379/382
(58) Field of Search ................................ 379/161, 377, 379/380, 379, 393, 399.01, 93.01, 93.02, 93.03, 93.04, 93.05, 413.02, 413.03

(56) References Cited

U.S. PATENT DOCUMENTS

| | | | | |
|---|---|---|---|---|
| 4,319,144 A | * | 3/1982 | King et al. .................... 327/28 |
| 4,420,786 A | * | 12/1983 | Toney ......................... 361/77 |
| 4,535,203 A | * | 8/1985 | Jenkins et al. ............... 379/333 |
| 4,815,126 A | * | 3/1989 | Goode et al. ................. 379/359 |
| 5,111,502 A | * | 5/1992 | McClure et al. ............. 379/380 |
| 5,600,715 A | | 2/1997 | Bingel ........................ 379/393 |
| 5,655,010 A | | 8/1997 | Bingel ..................... 379/93.28 |
| 5,717,752 A | * | 2/1998 | Whitney ................. 379/399.01 |
| 5,805,669 A | | 9/1998 | Bingel et al. ................. 379/28 |
| 5,812,537 A | | 9/1998 | Betts et al. ................... 370/286 |
| 5,818,926 A | * | 10/1998 | Challis .................. 379/399.01 |
| 5,828,657 A | | 10/1998 | Betts et al. .................. 370/289 |
| 5,841,840 A | | 11/1998 | Smith et al. ............. 379/93.01 |
| 5,848,150 A | | 12/1998 | Bingel ........................ 379/399 |
| 5,901,205 A | | 5/1999 | Smith et al. ............. 379/93.01 |
| 5,999,619 A | | 12/1999 | Bingel ........................ 379/394 |
| 6,014,425 A | | 1/2000 | Bingel et al. ................. 379/27 |
| 6,028,919 A | | 2/2000 | Bingel et al. ................ 379/142 |
| 6,061,392 A | | 5/2000 | Bremer et al. ............... 375/222 |
| 6,078,613 A | | 6/2000 | Bingel ........................ 375/220 |
| 6,181,588 B1 | * | 1/2001 | Kates et al. ................. 363/126 |
| 6,212,227 B1 | * | 4/2001 | Ko et al. ..................... 375/222 |
| 6,292,050 B1 | * | 9/2001 | Dooley et al. ............... 327/540 |
| 6,359,972 B1 | * | 3/2002 | Schott et al. ............. 379/93.01 |
| 6,549,439 B1 | * | 4/2003 | Yu .............................. 363/127 |
| 6,567,520 B1 | * | 5/2003 | Murphy et al. .............. 379/377 |

* cited by examiner

Primary Examiner—Curtis Kuntz
Assistant Examiner—Tuan Pham
(74) Attorney, Agent, or Firm—Thomas, Kayden, Horstemeyer & Risley LLP

(57) ABSTRACT

A plain old telephone system (POTS) device, for example but not limited to, a telephone, facsimile machine, analog modem, caller identification (ID) system, speaker phone, cordless phone, etc., employs an on-board transistor-based linear polarity guard to enable decoupling of a POTS channel from one or more xDSL channels on a telephone connection (subscriber loop associated with a public service telephone network), while reducing undesirable interference, such as intermodulation distortion imposed upon the POTS and xDSL channels. Transistors associated with the polarity guard are operated in the ohmic region, or in a nonsaturated linear mode, to achieve a substantially linear transfer function through the transistors and through the overall linear polarity guard. Current that is input to the polarity guard and the voltage drop across the transistors that conduct the current in the polarity guard exhibit a substantially linear relationship, or linear VI transfer function. Hence, the VI relationship between the overall output voltage and overall input current of the polarity guard is substantially linear in the operating region of the polarity guard.

29 Claims, 6 Drawing Sheets

FIG. 1
PRIOR ART

TELEPHONE LINE
(OR SUBSCRIBER LOOP)

LINEAR POLARITY GUARD AND METHOD FOR DSL-READY POTS DEVICES

For this application and pursuant to 35 U.S.C. Section 119, the inventors herein claim priority to and the benefit of the filing date of copending commonly assigned provisional application, "LINEAR POLARITY GUARD FOR DSL-READY TELEPHONES," filed Feb. 14, 2000, and assigned Ser. No. 60/182,345. The foregoing document is incorporated by reference in its entirety.

FIELD OF THE INVENTION

The present invention generally relates to the art of data communications and telephony. More particularly, the invention relates to a plain old telephone system (POTS) device, or a device that operates in connection with the Public Service Telephone Network (PSTN), for example but not limited to, a telephone, facsimile machine, analog modem, caller ID system, speaker phone, cordless phone, etc., that employs an on-board linear polarity guard to enable reliable and efficient decoupling of a POTS channel from one or more xDSL channels on a telephone connection, while reducing undesirable interference, such as intermodulation distortion imposed upon the POTS and xDSL channels.

BACKGROUND OF THE INVENTION

Figure 1:
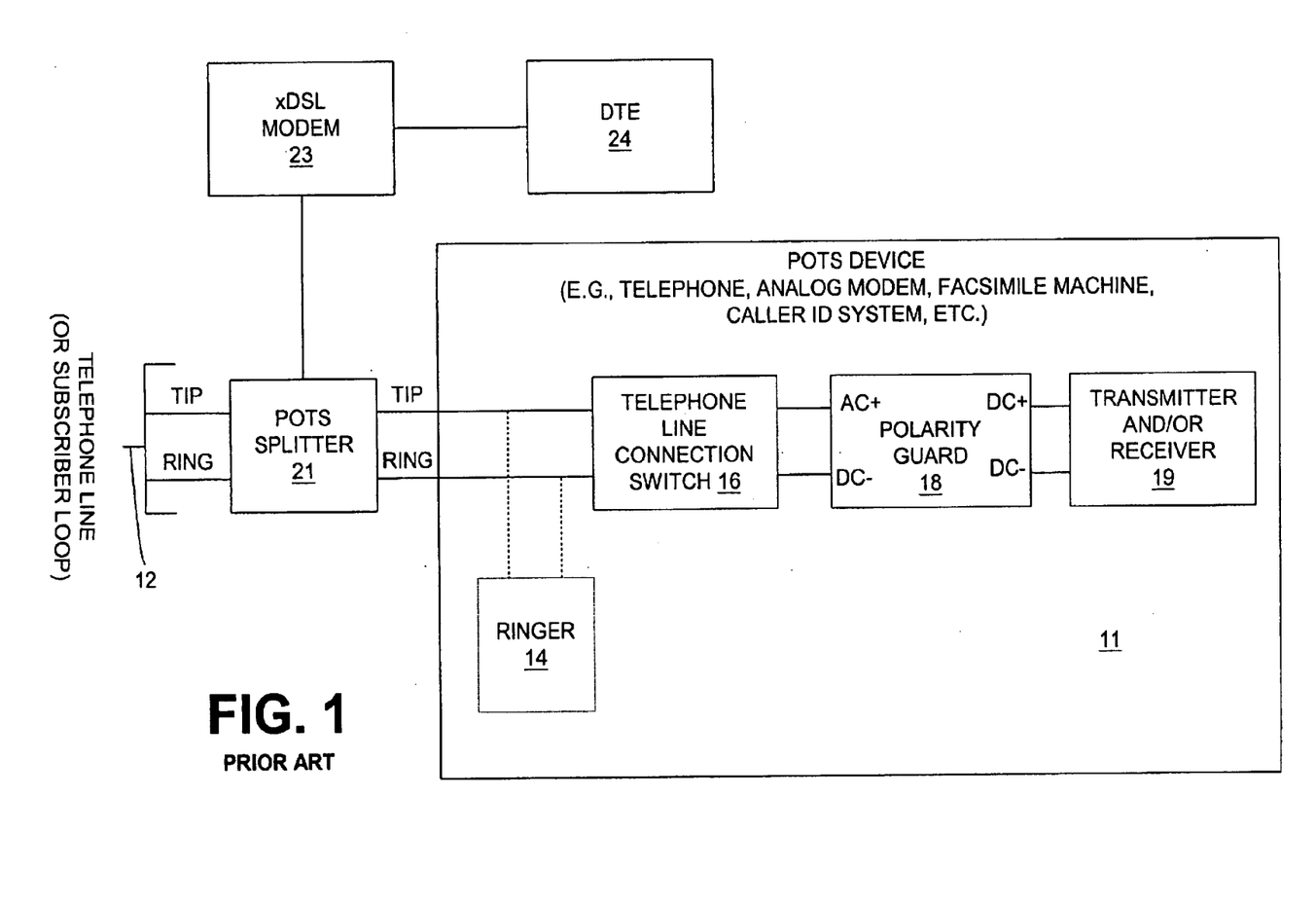
FIG. 1 is a block diagram of a POTS device of the prior art, which includes a polarity guard as shown.

FIG. 1 shows a conventional plain old telephone service (POTS) device 11 that is connected to a 2-wire (tip and ring lines) copper telephone line 12, also known as subscriber loop. The POTS device 11 can be a telephone, analog modem, facsimile machine, etc. As shown, the POTS device 11 may include a ringer 14, for example, in the case of a telephone, that is connected to the tip and ring lines associated with the telephone connection 12. A telephone line connection switch 16, for example, a hook switch in the case of a telephone, serves to electrically connect and disconnect the POTS device 11, except for the ringer 14, if applicable, to and from the telephone connection 12, as appropriate. In the case of a telephone, when the telephone is "on-hook," the switch 16 serves to isolate the telephone polarity guard 18 and transmitter/receiver 19 from the telephone line 12, and when the telephone is "off-hook," the switch 16 serves to connect the telephone polarity guard 18 and transmitter/receiver 19 to the telephone line 12. Polarity guard 18 connected to the switch 16 essentially enables the tip and ring connections from the POTS device 11 to be connected to either the tip and ring connections, respectively, or the ring and tip connections, respectively, of the telephone line 12. The polarity guard 18 thus accommodates tip/ring polarity reversals to the POTS Device 11. Finally, a transmitter, receiver, or both (transceiver) 19 is connected to the polarity guard 18 for transmitting and/or receiving signals. The transmitter, receiver, or transceiver, denoted collectively by reference numeral 19, implements the modulation and other signal processing functions, as appropriate.

Recently, in the art of telephony, the 2-wire telephone line 12 has been utilized for communicating more than one simultaneous communications signals, such as one or more digital data signals in addition to the analog POTS voice signals. For example, a high speed digital subscriber line (xDSL, e.g., asymmetric DSL (ADSL), symmetric DSL (SDSL), rate adaptive digital subscriber line (RADSL), very high speed DSL (VDSL), ISDN-based DSL (IDSL), etc.) channel and a POTS channel can be established over a single physical 2-wire connection. The signals are typically separated in frequency. The POTS channel usually exhibits a frequency spectrum of about 0 KHz to about 4 KHz, whereas the xDSL channels exhibit a frequency spectrum of about 20 KHz to about 1 MHz.

A POTS splitter 21, also known as a telephone filter, a microfilter, or a CP (customer premises) filter, has traditionally been utilized to decouple the channels, or separate the POTS channel from the other channels, due to non-linearities inherent in most, if not all central office powered telephones. The CP POTS splitter is usually implemented in series with the POTS device 11 in order to reduce the xDSL power imparted on the POTS device electronics, which imposes interference upon the POTS and xDSL signal.

A POTS splitter 21 is typically a passive or active two or three port device. The POTS splitter 21 is installed at the customer premises (CP) between a telephone jack and the POTS device 11 itself and is also connected to a DSL device 23 at the CP. It includes a POTS filter (a two port device) situated between the telephone line 12 and the POTS device 11 that is designed to minimize high frequency transients produced by on-hook/off-hook transitions, so as to prevent tainting or slowing of the high speed data on the DSL channel. Also, it is usually configured to provide a high impedance to the telephone line 12 in the DSL frequency band in order to prevent DSL power from being shunted and reduced by POTS device 11 that is connected to the line 12. Also, the splitter 21 reduces incident DSL signal power to reduce DSL signal intermodulation distortion (IMD), which undesirably creates noise in the receiver of the POTS device 11 (which in the case of a telephone, can be heard over the handset). DSL signal IMD can also interfere with DSL modem operation.

The specification of POTS splitters 21 has been the subject of several industry standards bodies. For example, see American National Standards Institute, ANSI T1.413–1995, Sections 8 and 10, regarding ADSL/POTS splitters. Moreover, as an example of a possible implementation of a POTS splitter, see J. Cook, P. Sheppard, "ADSL and VADSL Splitter Design and Telephony Performance," *IEEE Journal on Selected Areas in Communications*, December 1995.

Because of the foregoing requisite functionality, POTS splitters 21 are usually expensive devices and are oftentimes installed on a physical wall of the CP, such as on an outside wall of a building. Furthermore, generally, POTS splitters 21 require installation by a skilled telephone company worker, not the premise owner, resulting in undesirable installation time, labor, and expense.

Commonly assigned U.S. Pat. No. 5,848,150 to T. J. Bingel, entitled, "PASSIVE DISTRIBUTED FILTER SYSTEM AND METHOD," describes a distributed POTS filter system employing a plurality of passive two port POTS filters. Each POTS filter (not shown in FIG. 1 for simplicity) is situated between the telephone line 12 and a respective POTS device 11 for enabling decoupling of a POTS channel from one or more xDSL channels that are communicated simultaneously with the POTS channel along the telephone connection. The POTS filter can also be situated within a POTS device 11, instead of on the outside.

Although meritorious and effective to an extent, the POTS splitters and filters add undesirable complexity and circuitry to the systems. Furthermore, the POTS splitters and POTS filters usually contain an inductor(s) in series with the telephone line and a capacitor(s) in parallel with the telephone. The presence of these reactive elements introduces concerns about excessive POTS attenuation, reduced PSTN network stability, poor telephone sidetone, increased ringer loading, and degraded termination impedance, especially with multiple telephones on the telephone line (a typical scenario). Thus, a heretofore unaddressed need exists in the industry for an improved filtering systems and methods.

SUMMARY OF THE INVENTION

The present invention provides a plain old telephone system (POTS) device, for example but not limited to, a telephone, facsimile machine, analog modem, caller identification (ID) system, speaker phone, cordless phone, etc., that employs an on-board linear polarity guard to enable reliable and efficient decoupling of a POTS channel from one or more xDSL channels on a telephone connection (subscriber loop), while permitting and not substantially interfering with the xDSL channels. In fact, the linear polarity guard reduces interference that would otherwise be present typically, such as harmonic distortion and intermodulation distortion imposed upon the POTS and xDSL channels.

In general, the polarity guard is designed to exhibit a substantially linear transfer function so that a POTS signal can be effectively decoupled from the telephone line, which has the POTS signal and one or more xDSL signals, with no significant adverse impact on the xDSL channel(s) and without using a POTS splitter or POTS filter between the telephone line and the POTS device. The linear transfer function is accomplished by operating transistors associated with the polarity guard in the ohmic region, or in a nonsaturated linear mode, to achieve a substantially linear transfer function through the transistors and through the overall linear polarity guard. Current that is input to the polarity guard and the voltage drop across the transistors that conduct the current in the polarity guard exhibit a substantially linear relationship, or linear VI transfer function. Hence, the relationship between the output voltage and input current of the polarity guard is substantially linear in the operating region of the polarity guard.

The invention can also be conceptualized as providing methods for a POTS device that is connected to a subscriber loop. Broadly stated, one such method can be summarized by the following steps: powering the POTS device with electricity received from a telephone subscriber loop; and implementing a polarity guard circuit in connection with POTS device that exhibits a linear VI transfer function between input current and voltage drop across the polarity guard circuit. This results in a substantially linear relationship between the output voltage and input current of the polarity guard as the polarity guard operates.

The invention has numerous advantages, a few of which are delineated hereafter, as merely nonlimiting examples.

An advantage of the linear polarity guard is that it provides a way of achieving telephone xDSL compatibility without a POTS splitter or POTS filter. That is, the linear polarity guard enables telephone manufacturers to design and produce DSL compatible telephones.

Another advantage of the linear polarity guard is that it reduces undesirable harmonic distortion and intermodulation interference that typically arises on both POTS and xDSL channels that share a common connection due to the power disparity on the POTS and xDSL channels, i.e., the fact that the xDSL channel power is much larger than that of the POTS channel.

Another advantage of the linear polarity guard is that it can be used in any data communication device that connects to a single physical connection having at least two communications channels (e.g., a high speed xDSL link in combination with a POTS link), where the channels are separated by frequency, and that includes a telephone line connection/disconnection switch (such as a hook switch).

Another advantage of the linear polarity guard is that it can be used to effect economical deployment of a xDSL communications channels simultaneously in combination with a POTS communications channel on a telephone connection.

Another advantage of the linear polarity guard is that it benefits central office (CO) electronics because it minimizes power consumption by the customer premises equipment (CPE).

Another advantage of the linear polarity guard is that it is simple in design, efficient in operation, and easily and economically implemented and manufactured on a mass scale.

Another advantage of the linear polarity guard is that it is very desirable for typical homeowners and consumers in that it eliminates that need for installation of a POTS splitter and POTS filter in many applications.

Another advantage of the linear polarity guard is that it meets surge and safety requirements of industry standard UL1950, Third Edition, and applicable requirements of FCC, Part 68.

Another advantage of the linear polarity guard is that it can be implemented in a semiconductor microchip and produced on a mass scale. Furthermore, it can be used to wholly replace (in a modular manner) existing nonlinear polarity guards in conventional POTS devices.

Other systems, methods, features, and advantages of the present invention will become apparent to one with skill in the art upon examination of the following drawings and detailed description. It is intended that all such additional systems, methods, features, and advantages be included herein within the scope of the present invention and protected by the claims.

BRIEF DESCRIPTION OF THE DRAWINGS

The invention can be better understood with reference to the following drawings. The drawings are not necessarily to scale, emphasis instead being placed upon clearly illustrating principles of the present invention. Furthermore, in the drawings, like reference numerals designate corresponding part throughout the several views.

DETAILED DESCRIPTION OF THE PREFERRED EMBODIMENT

For clarity in defining the present invention, the prior art will be briefly described before the present invention. FIG.

Figure 2:
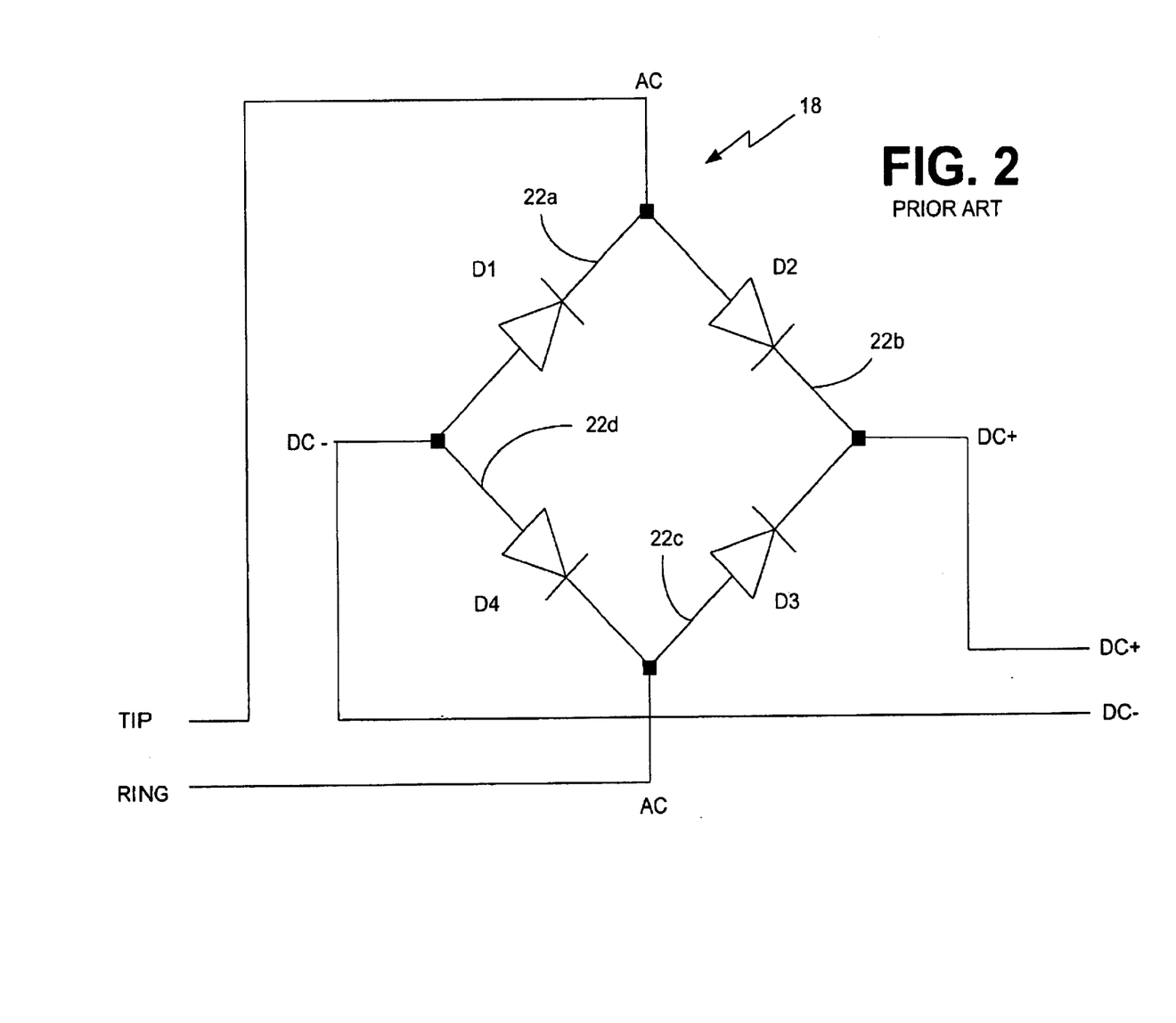
FIG. 2 is a circuit diagram of the polarity guard of FIG. 1.

2 shows the architecture of a typical balanced prior art polarity guard 18, which is similar in architecture to a rectifier circuit in the electrical power arts. Polarity guards 18 are well known in the art of telephony. As illustrated in FIG. 2, the polarity guard 18 includes branches 22a–22d having respective diodes D1–D4. Situated with forward polarity (will conduct current in this direction provided that the diode threshold voltage is imposed), the diode D1 connects the negative DC (direct current; constant voltage) node to a first AC (alternating current; time varying voltage) node. Situated with forward polarity, the diode D2 connects the first AC node to the positive DC node. Situated with reverse polarity, the diode D3 connects the positive DC node to the second AC node. Situated with reverse polarity, the diode D4 connects the second AC node to the negative DC node.

In operation, the polarity guard 18 receives a POTS signal on line 12, which contains both an AC component (analog voice) and a DC offset, which can be positive or negative depending upon the loop connection. Depending upon the configuration of the tip (T) and ring (R) connections between the POTS device 11 and the telephone line 12 and depending upon whether the DC offset is positive or negative, either diodes D1 and D3 or diodes D2 and D4 will be functional and conduct current. In the scenario shown in FIG. 2 and assuming the DC offset is positive, then diodes D2 and D4 will conduct current and provide an output signal across the nodes DC+ and DC−.

Figure 3:
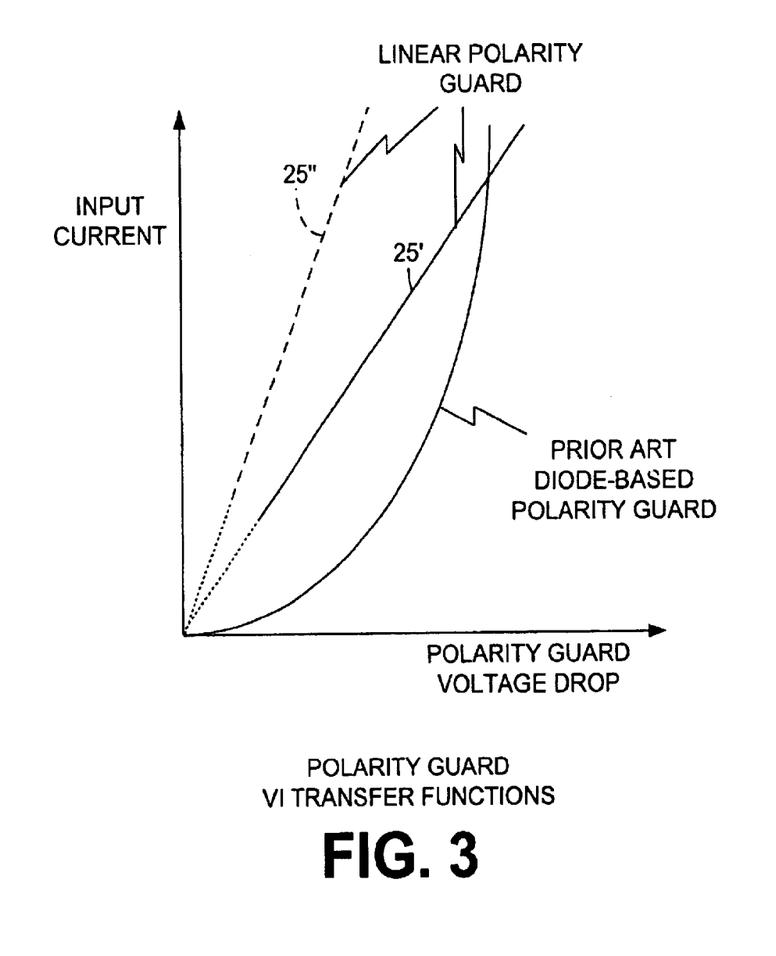
FIG. 3 is a graph (input current versus voltage drop) of the VI transfer functions associated with the prior art nonlinear polarity guard of FIGS. 1 and 2 and with the linear polarity guard of the present invention, for purposes of comparing same.

The prior art polarity guard 18 has a nonlinear VI transfer function as shown by a corresponding curve in FIG. 3. In other words, the input current of the polarity guard and voltage drop (as well as overall output voltage) across the polarity guard are not linear with respect to each other. In this context, the voltage drop is defined as the sum of the voltages across the one or more conducting diodes (one in the case of an unbalanced design, and two in the case of a balanced design as shown in FIG. 2). Specifically, if the tip-to-ring voltage in FIG. 2 were positive, then the voltage drop would be the sum of the voltages across diodes D2, D4, and if the tip-to-ring voltage in FIG. 2 were negative, then the voltage drop would be the sum of the voltages across diodes D1, D3. Moreover, the diode nonlinear VI relationship is defined by the Shockley equation: $I=I_o(e^{V/nVT}-1)$, where I is the input current, $I_o$ is the reverse saturation current, V is the voltage drop, n is approximately unity for germanium p-n junction diode and approximately 2 for silicon p-n junction diode at rated current, and VT is the volt equivalent of temperature (26 mV at room temperture). This nonlinear feature is undesirable in the context of xDSL communication signals, as discovered by the inventors, because signal harmonics and intermodulation, caused by xDSL signals propagating into the polarity guard 18, interfere with the xDSL signals, resulting in an undesirable degradation in speed and performance of the xDSL channels and audible noise in prior art POTS devices, e.g. telephones. Accordingly, the inventors have designed a new linear polarity guard (FIGS. 5 and 6 to be described in detail hereinafter) for a POTS device, that exhibits a linear VI transfer function between voltage drop (as well as output voltage) and input current as shown in FIG. 3, so that signal harmonics and intermodulation are minimized and do not substantially affect the xDSL and POTS signals and so that the POTS signal is effectively separated, or decoupled, from the line 12. Worth noting is that this is accomplished without the need for a POTS splitter 21 (FIG. 1) or POTS filter, though one or both could be employed in combination with the linear polarity guard of the invention. Additionally, the invention could be used to minimize the degree or order of POTS filter required for the POTS device, whether the POTS filter is external or internal to the POTS device.

Figure 4:
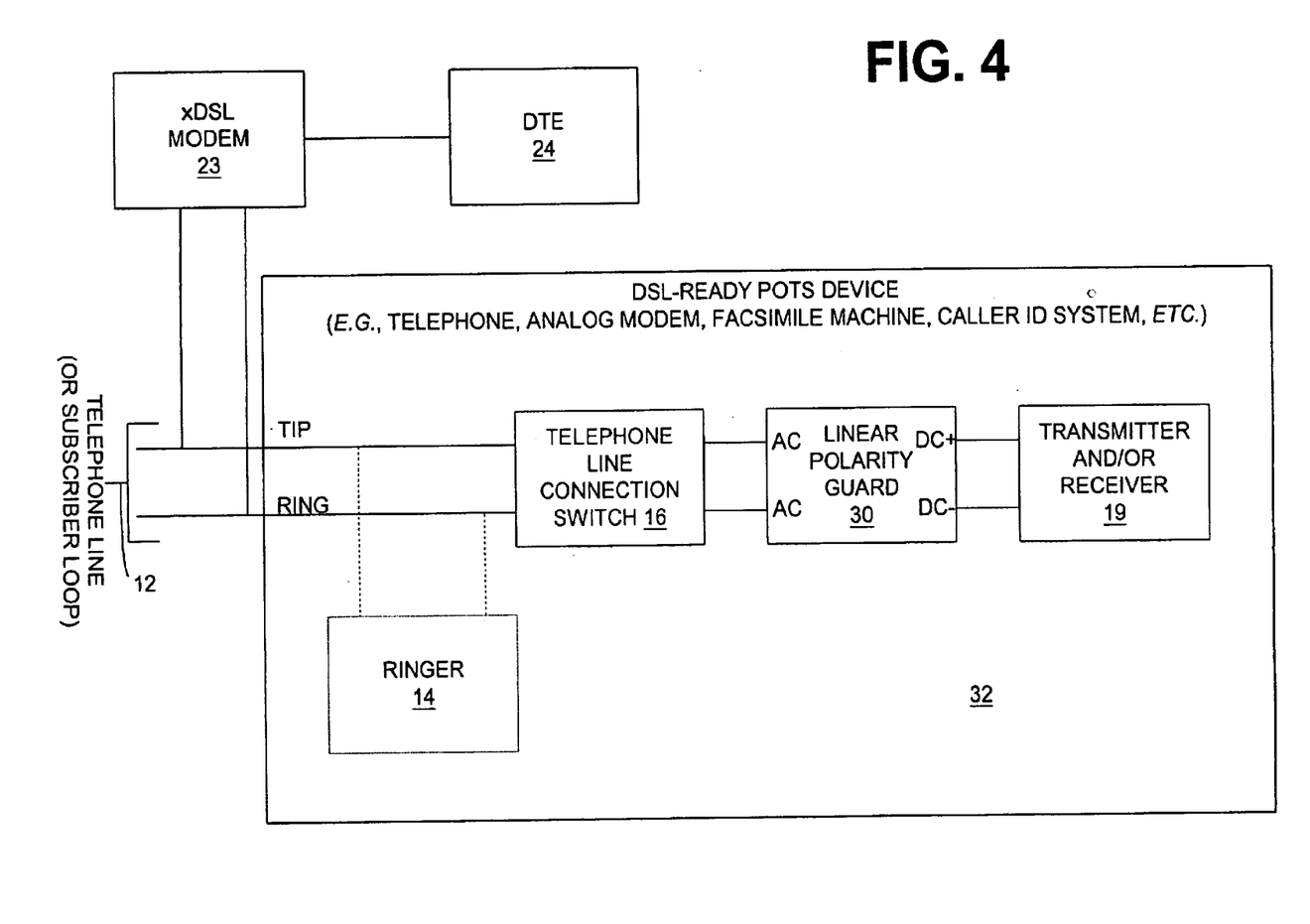
FIG. 4 is a circuit diagram of a POTS device employing an on-board linear polarity guard in accordance with the present invention and exhibiting the linear VI transfer function shown in FIG. 3.

A DSL-ready POTS device in accordance with the present invention is illustrated in FIG. 4 and is generally denoted by reference numeral 32. The DSL-ready POTS device 32 can be, for example but not limited to, a telephone, facsimile machine, analog modem, caller identification (ID) system, speaker phone, cordless phone, etc. The DSL-ready POTS device 32 can be directly connected to a subscriber loop 12 having a POTS channel and one or more other coexisting channels, such as high speed digital subscriber line channels (xDSL, e.g., ADSL, SDSL, RADSL, VDSL, IDSL, etc.) to effectively decouple the POTS channel from the loop 12, while minimizing adverse effects, such as harmonic distortion or intermodulation distortion to the one or more xDSL channels.

A linear polarity guard 30 and a DSL-ready POTS device 32 that employs the linear polarity guard 30 are illustrated by way of a block diagram in FIG. 4. In architecture, as shown in FIG. 4, the DSL-ready POTS device 32 may include a ringer 14, for example, in the case of a telephone, that is connected to the tip and ring lines associated with the telephone connection 12. A telephone line connection switch 16, for example, a hook switch in the case of a telephone, serves to connect and disconnect the POTS device 11 to and from the telephone connection 12, as appropriate. In the case of a telephone, when the telephone is "on-hook," the switch 16 serves to isolate the telephone from the telephone line 12, and when the telephone is "off-hook," the switch 16 serves to connect the telephone to the telephone line 12. The linear polarity guard 30 is connected to the switch 16 and essentially enables the tip and ring connections from the POTS device 11 to be connected to either the tip and ring connections, respectively, or the ring and tip connections, respectively, of the telephone line 12. The linear polarity guard 30 thus enables easy and safe installation of the POTS device 32. Finally, a transmitter, receiver, or both (transceiver) 19 is connected to the linear polarity guard 30 for transmitting and/or receiving signals. The transmitter, receiver, or transceiver, denoted collectively by reference numeral 19, implements the modulation and other signal processing functions, as appropriate.

One or more xDSL modems 23 can be connected to the tip and ring lines of the telephone line 12 in order to permit communications over one or more of the xDSL channels on the loop 12. These xDSL channels can exist concurrently with the POTS communications channel on the telephone connection 12 without any appreciable interference due to harmonic distortion or intermodulation distortion to each, in accordance with the invention. These xDSL modems 23, also known as data channel modems or digital modems, service data terminal equipment 24 (DTE). Moreover, because of the linear polarity guard 30, the xDSL channels can achieve high speed and performance, as they are not substantially adversely affected by the POTS device electronics and the POTS signal decoupling hardware.

Also, one or more DSL-ready POTS devices 32 can be connected to the telephone line 12 and supported, up to the ringer equivalence number (REN) limit.

Although not shown in FIG. 4 for simplicity, the linear polarity guard 30 can be located before the telephone line connection switch 16, instead of after it, as shown. Furthermore, the linear polarity guard 30 could be situated somewhere within the electronics 18. Finally, although not required, note that a POTS filter (not shown) could be implemented in combination with the linear polarity guard 30, somewhere before the guard 30, in order to complement the guard's effectiveness. The POTS filter could be implemented outside of the POTS device 32 or inside the POTS device 32, as is described in copending commonly assigned U.S. patent application by T. J. Bingel and R. B. Hazen, entitled, "DSL-READY POTS DEVICE AND METHOD," which is incorporated herein by reference. This application describes implementing a two port POTS filter after the telephone line connection switch 16 in FIG. 4 (e.g., a hook switch in a telephone) to minimize adverse effects from the POTS filter upon the one or more xDSL channels.

FIRST EMBODIMENT

Figure 5:
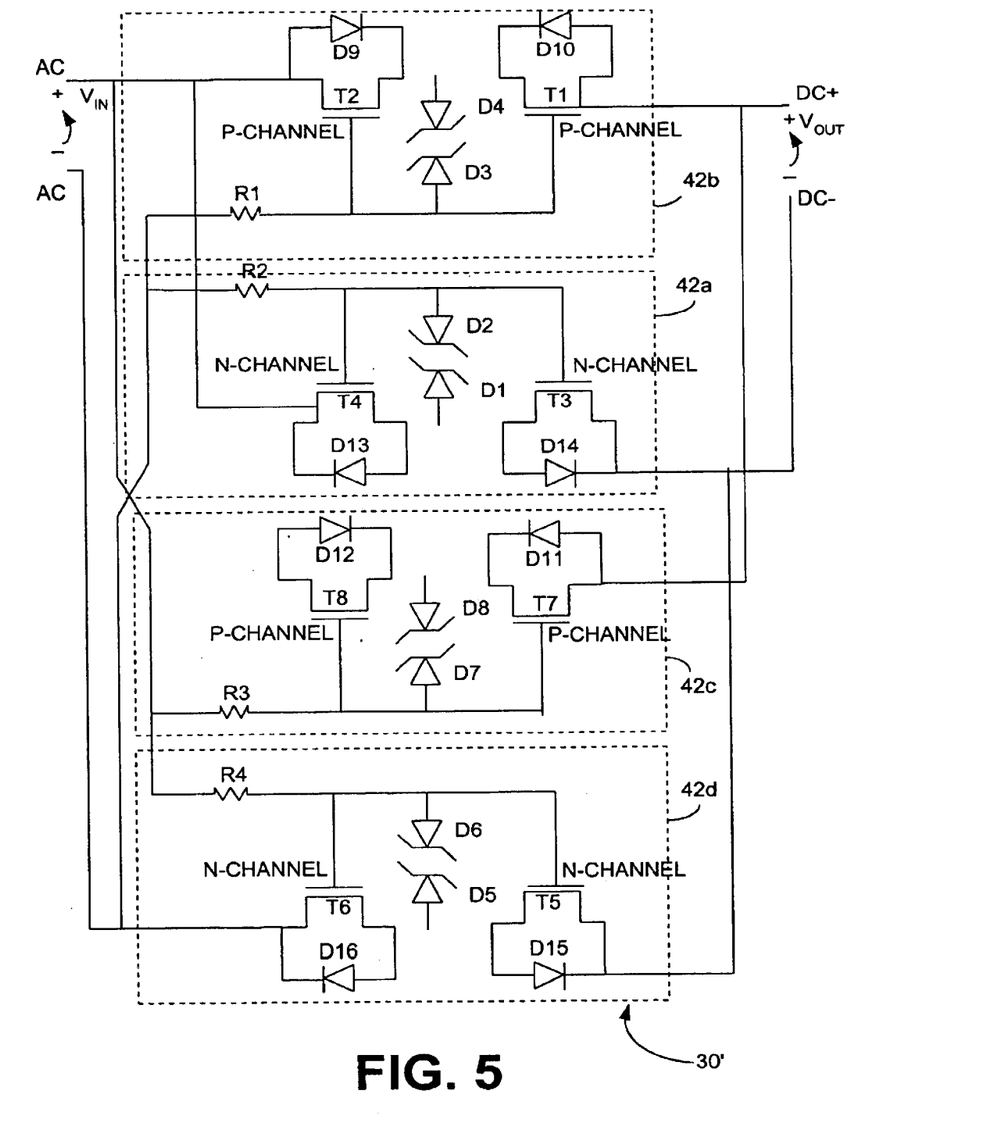
FIG. 5 is a circuit diagram of a first embodiment of the linear polarity guard of FIG. 4.

FIG. 5 is a circuit diagram of a first embodiment of the linear polarity guard 30 (FIG. 4) and is generally denoted by reference numeral 30'. This is currently the best mode known to the inventors for practicing the present invention. The linear polarity guard 30' will exhibit the linear VI transfer function indicated by line 25' in FIG. 3. The solid part of line 25' indicates the usual linear operating region of the polarity guard 30'. (The small-dash part extending to the graph origin indicates the linear region that typically is not useable by the polarity guard 30' because the enhancement mode MOSFETs are not sufficiently biased into the ohmic region for linear operation. However, MOSFETs can be fabricated with very low VON, therefore this unusable region near the graph origin can be minimized, if necessary.) The line 25' graphically indicates the substantially linear relationship between input current and voltage drop (as well as output voltage) across the linear polarity guard 30'.

In general, the linear polarity guard 30' of the preferred embodiment is a balanced circuit (unbalanced versions are possible, although are not preferred) in that it is designed so that the tip and ring lines can be connected to nodes AC+ and AC−, either respectively or vice versa. The linear polarity guard 30' includes four branches 42a–42d, which correspond and are connected end-to-end as the branches 22a–22d (FIG. 2), respectively, associated with the prior art nonlinear polarity guard 18 (FIG. 2). Thus, after the tip and ring lines are connected, either branches 42a, 42c or branches 42b, 42d will be functional. For example, if the tip and ring lines are connected to the top and bottom AC lines, respectively, then branches 42b and 42d will be the functional branches, with branch 42b conducting current when AC+ is positive with respect to AC− during a positive AC cycle and with branch 42d conducting current when AC+ is negative with respect to AC− during a negative AC cycle. The other two branches 42a, 42c, in this scenario act as open circuits. If the tip and ring lines are switched, then the opposite of the foregoing scenario will occur.

In a possible alternative embodiment that is an unbalanced version of the linear polarity guard 30', only two of the four branches 42a–42d are utilized, for instance 42b and 42d. In this configuration, after the tip and ring lines are connected appropriately with the tip and ring lines connected to the top and bottom AC lines, respectively, branches 42b and 42d will be the functional branches, with branch 42b conducting current during a positive AC cycle and with branch 42d conducting current during a negative AC cycle. If the tip and ring lines are switched, then the circuit will not function properly for its desired purpose.

With reference to FIG. 5, for the polarity shown for voltage $V_{IN}$, vertical P-channel enhancement-mode power MOSFETs (transistors) T2 and T1 are biased into the ohmic operating region (where the output current $I_D$ and voltage $V_{DS}$ have a substantial linear relationship) by the action of resistor R1 applying a negative voltage on the gates of transistors T2 and T1 with respect to their respective drain or source. Specifically, for vertical P-channel enhancement-mode power MOSFETs T2 and T1, bias in the ohmic region is accomplished when the channel is strongly enhanced with majority carriers (hole for P-channel MOSFETs), or when $V_{GS}<V_{ON}$, or $V_{GD}<V_{ON}$ for small $V_{DS}$, where $V_{ON}$ is typically −3 to −20 V depending on the transistor. In the ohmic region, the MOSFET channel resistance is very low (ohms to milliohms, depending on the transistor) and linear. Otherwise, when $V_{GS}>>V_{ON}$, and $V_{GD}>>V_{ON}$, the vertical P-channel enhancement-mode power MOSFET's channel will be strongly depleted of majority carriers, substantially eliminating current flow through the channel.

Note that vertical-channel power MOSFETs T2, T1 have the useful property of very-low channel resistance in the ohmic operating region. However, accompanying construction of each of the vertical-channel power MOSFETs T2, T1 is a vestigial body diode. This body diode is shown in FIG. 5 as diode D9 for transistor T2 and diode D10 for transistor T1. Because of the undesirable conduction path created by the vertical-channel power MOSFET body diode, two vertical P-channel enhancement-mode power MOSFETs, T2 and T1, are connected in series. This series combination of transistors T2 and T1 affords the benefit that, when both transistors T2 and T1 are biased off, $V_{GS}>>V_{ON}$, or $V_{GD}>>V_{ON}$, no conduction path exists through either the vertical P-channel enhancement-mode power MOSFETs proper, and no conduction path exists through vestigial body diodes T2, T1. Regardless of the polarity of attempted current flow, one vestigial body diode (of T2 or T1) is always reversed biased, preventing current flow.

Returning to the situation where transistors T2 and T1 are biased into the ohmic operating region (herein referred to as "ON"; "OFF" will be referred to as a condition of a transistor that is not biased in the ohmic region), positive voltage $V_{OUT}$ is applied to the load, as desired, or to the electronics block 19 (FIG. 4).

Vertical N-channel enhancement-mode power MOSFETs T6 and T5 are likewise ON by the action of resistor R4 applying a positive voltage on the gates of transistors T6 and T5 with respect to their respective drain or source. Specifically, for vertical N-channel enhancement-mode power MOSFET's T6 and T5, bias in the ohmic region is accomplished when the channel is strongly enhanced with majority carriers (electrons for N-channel MOSFET's), when $V_{GS}>V_{ON}$, or $V_{GD}>V_{ON}$ for small $V_{DS}$, where $V_{ON}$ is typically +3 to +20 V depending on the transistor. In the ohmic region, the MOSFET channel resistance is very low (ohms to milliohms, depending on the device) and linear. Otherwise, when $V_{GS}<<V_{ON}$, and $V_{GD}<<V_{ON}$, the vertical N-channel enhancement-mode power MOSFET's channel will be strongly depleted of majority carriers, substantially eliminating current flow through the channel.

Note that vertical-channel power MOSFETs have the useful property of very-low channel resistance in the ohmic operating region. However, accompanying construction of a vertical-channel power MOSFET is a vestigial body diode. This body diode is shown in FIG. 5 as diode D16 for transistor T6 and diode D15 for transistor T5. Because of the undesirable conduction path created by the vertical-channel power MOSFET body diode, two vertical N-channel enhancement-mode power MOSFETs, T6 and T5, are connected in series. This series combination of transistors T6 and T5 affords the benefit that, when both transistors T6 and T5 are biased off, $V_{GS}<<V_{ON}$, or $V_{GD}<<V_{ON}$, no conduction path exists through either the vertical N-channel enhancement-mode power MOSFETs proper, and no conduction path exists through T6 and T5 vestigial body diodes. Regardless of the polarity of attempted current flow, one vestigial body diode (of T6 or T5) is always reversed biased, preventing current flow.

Returning to the situation where transistors T6 and T5 are biased into the ohmic operating region, herein referred to as ON, negative voltage $V_{OUT}$ is applied to the load, as desired.

Note that vertical N-channel enhancement-mode power MOSFETs T4 and T3 are OFF, since $V_{GS} \ll V_{ON}$, and $V_{GD} \ll V_{ON}$. Also note that vertical P-channel enhancement-mode power MOSFETs T8 and T7 are OFF, since $V_{GS} \gg V_{ON}$, and $V_{GD} \gg V_{ON}$.

For voltage $V_{IN}$ applied in opposite polarity to that shown in FIG. 5, transistors T4 and T3 are ON via current flow through resistor R2 and application of voltage by R2 to the gates of T4 and T3. Moreover, transistors T8 and T7 are ON via current flow through resistor R3 and application of bias voltage by R3 to the gates of T8 and T7. Finally, transistors T2 and T1 are OFF, and transistors T6 and T5 are OFF. The polarity of the voltage applied to the load remains as shown in FIG. 5, as desired.

Series opposing 15V zener diode pairs D1, D2; D3, D4; D5, D6; and D7, D8 prevent MOSFET gate-to-source overvoltage, or undesirable excess voltage.

An example of circuit component specifications for R1–R4; T1–T8; and zener diodes D1–D4 are as follows respectively: 20 MΩ; Motorola MTD1P40E or MTD2N40E (whichever applicable; each includes one of the vestigial body diodes D5–D16); and Motorola D1N5245. As is known to those with skill in the art, other component specifications and commercially available component types are possible.

SECOND EMBODIMENT

Figure 6:
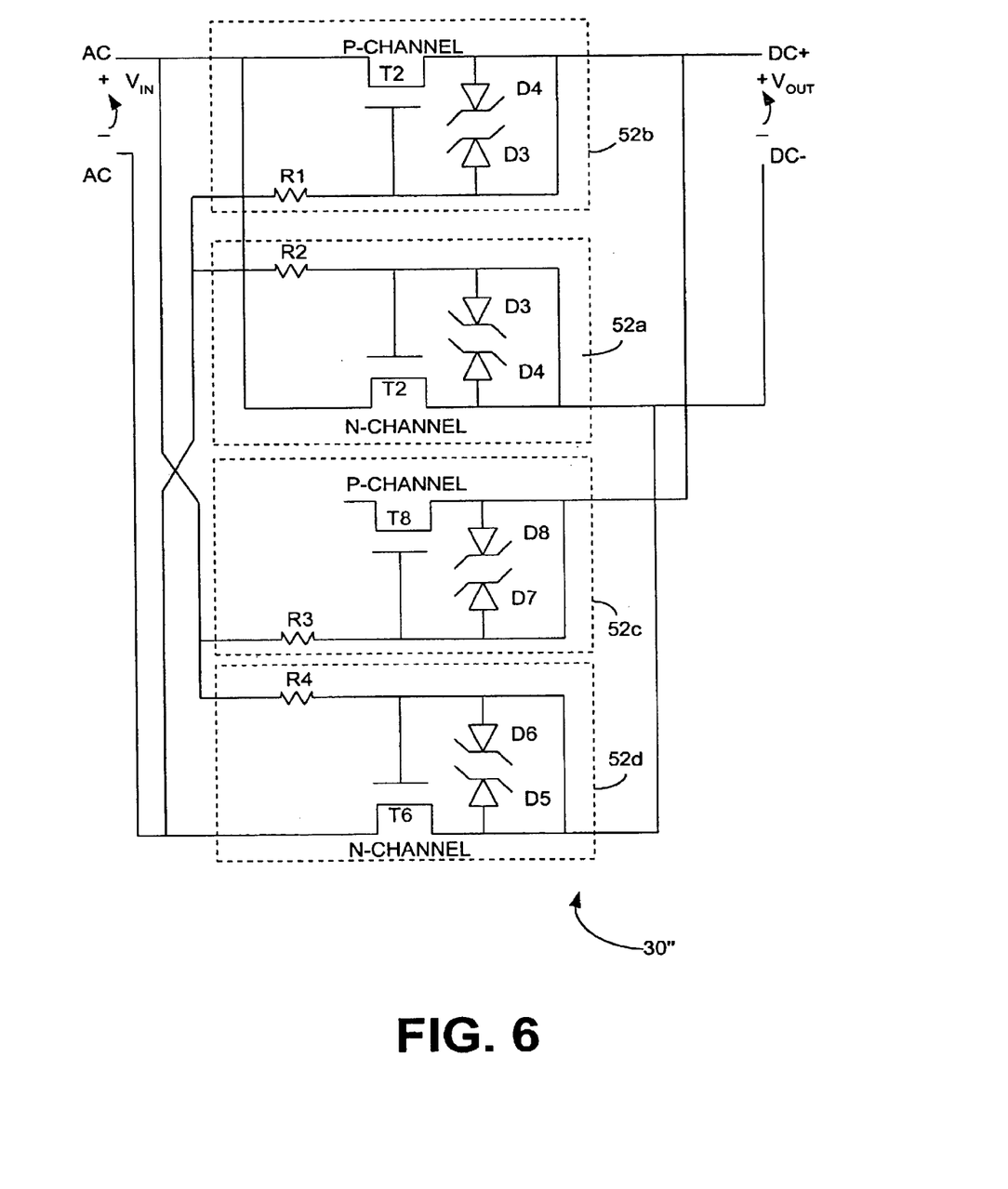
FIG. 6 is a circuit diagram of a second embodiment of the linear polarity guard of FIG. 4.

The configuration of the first embodiment can be simplified by eliminating the second series transistors T1, T3, T7, T5 along with their respective vestigial body diodes D10, D14, D11, D15, if the vestigial body diodes D9, D13, D12, D16 associated with corresponding transistors T2, T4, T8, T6 are eliminated or significantly minimized. This is the essence of the second embodiment of the linear polarity guard 30, which is shown in FIG. 6 and generally denoted by reference numeral 30". At the present time, it is possible but difficult to fabricate such MOSFETs with specifications practical for POTS devices; however, it is envisioned that such MOSFETs will be more widely available in the future with the further advancement of fabrication techniques, and when this occurs, the second embodiment will likely be more desirable than the first, in light of its more simplified circuit design.

When FIG. 6 is built with transistors of the same channel-resistance as those transistors in FIG. 5, linear polarity guard 30" will exhibit the linear VI transfer function indicated by a phantom line 25" in FIG. 3. The large-dash part of line 25" indicates the usual linear operating region of the polarity guard 30". (The small-dash part extending to the graph origin indicates the linear region that typically is not useable by the polarity guard 30" because the enhancement mode MOSFETs are not sufficiently biased into the ohmic region for linear operation. However, MOSFETs can be fabricated with very low $V_{ON}$, therefore this unusable region near the graph origin can be minimized, if necessary.) Additionally, as channel resistance of the transistors are minimized, the phantom line 25", indicating the substantially linear relationship between input current and voltage drop associated with the linear polarity guard 30", will increase in mathematical slope (graphically in FIG. 3, the top of the line 25" will move leftward, while still starting at the origin). This increase in mathematical slope of the VI relationship, due to either the reduction in the number of transistors in FIG. 6 embodiment compared to FIG. 5 embodiment, or due to reduction in transistor channel resistance, represents a beneficial reduction in polarity guard resistance. At any particular current, reduction in polarity guard resistance is beneficial since the linear voltage drop across the polarity guard is decreased, thus increasing the voltage available to the load at $V_{OUT}$. Additionally, reduced polarity guard resistance reduces polarity guard power loss and polarity guard power dissipation.

In general, the linear polarity guard 30" includes branches 52a–52d, which correspond and are connected as the branches 22a–22d, respectively, associated with the prior art nonlinear polarity guard 18 (FIG. 2). Thus, after the tip and ring lines are connected, either branches 52a, 52c or branches 52b, 52d will be functional. For example, if the tip and ring lines are connected to the top and bottom AC lines, respectively, then branches 52b and 52d will be the functional branches, with branch 52b and branch 52d conducting current when tip is positive with respect to ring. The other two branches 52a, 52c, in this scenario act as open circuits. If the tip and ring lines are switched, then the opposite of the foregoing scenario will occur.

OTHER VARIATIONS/MODIFICATIONS

It should be emphasized that the above-described embodiments of the present invention, particularly, the "first embodiment," the "second embodiment," and any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. Some examples (a nonexhaustive list) are set forth hereafter. All such modifications and variations are intended to be included herein within the scope of this disclosure and the present invention and protected by the following claims.

For example, although not optimal configurations, the MOSFETs can be replaced with bipolar transistors or even relays to practice the invention.

As another example, the linear polarity guard 30 of the invention can be applied to electrical power rectification in its present form. The linear polarity guard 30 has the property of reduced power dissipation and reduced power consumption compared to a conventional diode rectifier for the case where the voltage drop across the low-resistance power MOSFETs is less than the voltage drop of a power diode under similar current conditions. The reduced voltage drop may be beneficial in itself.

As yet another example, FIG. 6 can be modified such that the gate circuitry is controlled by the load voltage to mimic a diode rectifier's property of not conducting until the input voltage exceeds the load voltage.

Finally, note that it may be possible to construct a different type of circuit to implement the polarity guard that exhibits the desired linear VI transfer function. The inventors contend that the recognition of the need to have the linear VI transfer function is, in fact, inventive, and therefore, such an alternative circuit (regardless of its architecture, operation, and design) should fall within the scope of this disclosure and should ultimately be protected by the claims.

Now, therefore, at least the following is claimed:

1. A POTS polarity guard circuit comprising:
   a first transistors connecting a first DC output node and an AC input node;
   a second transistors connecting said AC input node and a second DC output node;
   a third transistors connecting said second DC output node and a second AC input node;
   a fourth transistors connecting said second AC input node and said first DC output node;
   wherein said first through fourth transistors, when conducting current, operate in their respective nonsaturated linear modes; and
   wherein either said first and third sets of transistors conduct current or said second and fourth conduct current when an input signal is received across said first and second AC input nodes, depending upon a polarity of an AC signal received at said first and second AC input nodes,
   wherein said first and fourth transistors are biased in a different direction than said second and third transistor.

2. The circuit of claim 1, wherein said first through fourth transistors are field effect transistors.

3. The circuit of claim 1, further comprising:
   a first set of in series transistors connecting a first DC output node and an AC input node;
   a second set of in series transistors connecting said AC input node and a second DC output node;
   a third set of in series transistors connecting said second DC output node and a second AC input node;
   a fourth set of in series transistors connecting said second AC input node and said first DC output node;
   wherein said each of said transistors, when conducting current, operate in their respective nonsaturated linear modes; and
   wherein either said first and third sets of transistors conduct current or said second and fourth sets of transistors conduct current when an input signal is received across said first and second AC input nodes, depending upon a polarity of a DC signal received at said first and second AC input nodes,
   wherein each transistor in the said first set and in the fourth set of in series transistors is biased in a first direction, and said each transistor in the second set and in the third set of in series transistors is biased in a second direction opposite to the first direction.

4. The circuit of claim 3, wherein said first through fourth transistors are field effect transistors.

5. The circuit of claim 3, wherein the first set of in series transistors comprises:
   a first MOSFET, where the first MOSFET comprises a first body diode biased in a third direction; and
   a second MOSFET, where the second MOSFET comprises a second body diode biased in a fourth direction opposite to the third direction.

6. The circuit of claim 3, wherein each transistor in said first set and in said fourth set of in series transistors is a P-channel MOSFET, and each transistor in said second set and said third set of in series transistors is an N-channel MOSFETs.

7. A POTS device that is designed to be powered by electricity received from a telephone subscriber loop and that implements the polarity guard circuit of claim 1.

8. The device of claim 7, wherein said polarity guard circuit interconnects a loop connection switch with a transceiver in said device.

9. The device of claim 7, wherein said polarity guard circuit interconnects said loop with a loop connection switch in said device.

10. The device of claim 7, wherein said device is a telephone.

11. The device of claim 7, wherein said device is a facsimile machine.

12. The device of claim 7, wherein said device is a modem.

13. The device of claim 7, wherein said device is a caller identification system.

14. The device of claim 7, further comprising:
    a connection connected to said device;
    a POTS channel on said connection and communicated through said device;
    at least one DSL channel on said connection; and
    wherein said device prevents harmonic and intermodulation distortion between said POTS and DSL channels.

15. The circuit of claim 1, wherein the gate of the first transistor and the gate of the second transistor are each coupled to the second AC input node, and the gate of the third transistor and the gate of the fourth transistor are each coupled to the first AC input node.

16. The circuit of claim 1, wherein the first and fourth transistors are P-channel MOSFETs, and the second and third transistors are N-channel MOSFETs.

17. A POTS polarity guard circuit comprising:
    a first transistor means for connecting a first DC output node and an AC input node;
    a second transistor means for connecting said AC input node and a second DC output node;
    a third transistor means for connecting said second DC output node and a second AC input node;
    a fourth transistor means for connecting said second AC input node and said first DC output node;
    wherein said first through fourth transistor means, when conducting current, operate in their respective nonsaturated linear modes; and
    wherein either said first and third transistor means conduct current or said second and fourth transistors conduct current when an input signal is received across said first and second AC input nodes, depending upon a polarity of an AC signal received at said first and second AC input nodes,
    wherein said first and fourth transistor means are biased in a different direction than said second and third transistor means.

18. The circuit of claim 17, wherein said first through fourth transistor means comprise field effect transistor means.

19. The circuit of claim 17, wherein:
    said first transistor means comprises a first set of in series transistors connecting said first DC output node and said AC input node;
    said second transistor means comprises a second set of in series transistors connecting said AC input node and said second DC output node;
    said third transistor means comprises a third set of in series transistors connecting said second DC output node and said second AC input node; and
    said fourth transistor means comprises a fourth set of in series transistors connecting said second AC input node and said first DC output node.

20. The circuit of claim 17, further comprising:
a subscriber loop means for communicating a low frequency voice signal and a high frequency data signal; and
wherein said polarity guard circuit is designed to attenuate distortion signal produced from said high frequency data signal within a frequency band associated with said low frequency voice signal.

21. The circuit of claim 17, further comprising:
a connection means for connecting to said circuit;
a POTS channel on said connection means and communicated through said circuit;
at least one DSL channel on said connection means; and
wherein said means serves the function of minimizing harmonic and intermodulation distortion between said POTS and DSL channels.

22. A method for a POTS device comprising the steps of:
coupling a first DC output node and an AC input node through a first transistor biased in a first direction;
coupling said AC input node and a second DC output node through a second transistor biased in a second direction different than the first direction;
coupling said second DC output node and a second AC input node through a third transistor biased in the first direction;
coupling said second AC input node and said first DC output node through a fourth transistor biased in the second direction;
conducting current through either both said first and third transistors or both said second and fourth transistors, while not permitting conduction of current through either both said second and fourth transistors or both said first and third transistors, respectively, when an input signal is received across said first and second AC input nodes and depending upon a polarity of a DC signal received at said first and second AC input nodes; and
when conducting said current, operating said transistors in a nonsaturated linear mode so that current input to said first and second AC input nodes and voltage drop across said first and second DC output nodes generally exhibits a linear relationship.

23. The method of claim 22, wherein the device is a telephone.

24. The method of claim 22, wherein the device is a facsimile machine.

25. The method of claim 22, wherein the device is a modem.

26. The method of claim 22, wherein the device is a caller identification system.

27. The method of claim 22, wherein said first through fourth transistors are field effect transistors.

28. The method of claim 22, further comprising the steps of:
coupling a first DC output node and an AC input node through a first set of in series transistors, each transistor in the first set biased in a first direction;
coupling said AC input node and a second DC output node through a second set of in series transistors, each transistor in the second set biased in a second direction different than the first direction;
coupling said second DC output node and a second AC input node through a third set of in series transistors, each transistor in the third set biased in the first direction;
coupling said second AC input node and said first DC output node through a fourth set of in series transistors, each transistor in the fourth set biased in the second direction;
conducting current through either both said first and third sets of transistors or both said second and fourth sets of transistors, while not permitting conduction of current through either both said second and fourth sets of transistors or both said first and third sets of transistors, respectively, when an input signal is received across said first and second AC input nodes and depending upon a polarity of a DC signal received at said first and second AC input nodes; and
when conducting said current, operating said transistors in a nonsaturated linear mode so that input current associated with said first and second AC input nodes and voltage associated with said first and second DC output nodes generally exhibits a linear relationship.

29. The method of claim 22, further comprising the steps of:
receiving a low frequency voice signal and a high frequency data signal from a POTS subscriber loop; and
attenuating a distortion signal produced from said high frequency data signal within a frequency band associated with said low frequency voice signal, using said polarity guard circuit.

* * * * *

UNITED STATES PATENT AND TRADEMARK OFFICE
CERTIFICATE OF CORRECTION

PATENT NO. : 6,845,157 B1
DATED : January 18, 2005
INVENTOR(S) : Bingel et al.

It is certified that error appears in the above-identified patent and that said Letters Patent is hereby corrected as shown below:

Column 11,
Lines 2, 4, 6 and 8, delete the "s" in "transistors".
Line 13, delete the words "sets of".
Line 14, insert the word -- transistors -- between the words "fourth" and "conduct".
Line 20, add an -- s -- to the word "transistor".

Signed and Sealed this

Third Day of May, 2005

JON W. DUDAS
*Director of the United States Patent and Trademark Office*